US012463312B2

(12) United States Patent
Kim et al.

(10) Patent No.: US 12,463,312 B2
(45) Date of Patent: Nov. 4, 2025

(54) CAVITY FILTER AND MANUFACTURING METHOD THEREFOR

(71) Applicant: KMW INC., Hwaseong-si (KR)

(72) Inventors: Jae Hong Kim, Yongin-si (KR); Sung Ho Jang, Yongin-si (KR); Bo Sung Kim, Hwaseong-si (KR); Kyoung Hun Ko, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 347 days.

(21) Appl. No.: 17/891,317

(22) Filed: Aug. 19, 2022

(65) Prior Publication Data

US 2022/0393325 A1 Dec. 8, 2022

Related U.S. Application Data

(63) Continuation of application No. PCT/KR2021/002048, filed on Feb. 18, 2021.

(30) Foreign Application Priority Data

Feb. 20, 2020 (KR) ........................ 10-2020-0020790
Feb. 17, 2021 (KR) ........................ 10-2021-0021134

(51) Int. Cl.
*H01P 1/208* (2006.01)
*H01P 11/00* (2006.01)

(52) U.S. Cl.
CPC ............ *H01P 1/208* (2013.01); *H01P 11/002* (2013.01)

(58) Field of Classification Search
CPC ....... H01P 1/208; H01P 11/002; H01P 1/2053
See application file for complete search history.

(56) References Cited

U.S. PATENT DOCUMENTS 5,608,363 A * 3/1997 Cameron .............. H01P 1/2084 333/219.1
9,287,600 B2 * 3/2016 Cao ......................... H01P 1/208
(Continued)

FOREIGN PATENT DOCUMENTS

CN 101527380 A 9/2009
CN 101626101 A 1/2010
(Continued)

OTHER PUBLICATIONS

International Search Report mailed Jun. 9, 2021 for International Application No. PCT/KR2021/002048 and its English translation.
(Continued)

*Primary Examiner* — Andrea Lindgren Baltzell
*Assistant Examiner* — Kimberly E Glenn
(74) *Attorney, Agent, or Firm* — Insight Law Group, PLLC; Seung Lee

(57) ABSTRACT

The present invention relates to a cavity filter and a method of manufacturing the same, and particularly, to a cavity filter including one side cavity and the other side cavity required to have capacitive cross-coupling design, resonant bars respectively provided at centers of one side cavity and the other side cavity, and a vertical post for a notch extending from any one of the resonant bars and extending in a vertical direction in an inner wall that is a boundary between one side cavity and the other side cavity, in which the resonant bar, which is connected to the vertical post for a notch among the resonant bars, is integrated with the vertical post for a notch, thereby providing an advantage of easily manufacturing the cavity filter and easily performing capacitive cross-coupling design.

18 Claims, 19 Drawing Sheets

(56) References Cited

U.S. PATENT DOCUMENTS

| | | | |
|---|---|---|---|
| 2010/0188171 A1 | 7/2010 | Mohajer-Iravani et al. | |
| 2016/0301122 A1* | 10/2016 | Chun | H01P 1/205 |
| 2018/0301781 A1 | 10/2018 | Peng et al. | |

FOREIGN PATENT DOCUMENTS

| | | | |
|---|---|---|---|
| CN | 102428602 | A | 4/2012 |
| CN | 103378388 | A | 10/2013 |
| CN | 107181033 | A | 9/2017 |
| CN | 110265753 | A | 9/2019 |
| CN | 110534851 | A | 12/2019 |
| CN | 110729539 | A | 1/2020 |
| JP | H07-249904 | A | 9/1995 |
| JP | H10-313202 | A | 11/1998 |
| JP | 2013-225787 | A | 10/2013 |
| JP | 2018/535617 | A | 11/2018 |
| JP | 2018-538763 | A | 12/2018 |
| KR | 10-2010-0018917 | A | 2/2010 |
| KR | 10-2010-0124979 | A | 11/2010 |
| KR | 10-2012-0129240 | A | 11/2012 |
| KR | 10-2016-0015063 | A | 2/2016 |
| KR | 10-2019-0093049 | A | 8/2019 |
| WO | 2014/029263 | A | 2/2014 |
| WO | 2018/137315 | A | 8/2018 |
| WO | 2019/151655 | A | 8/2019 |
| WO | 2020/010984 | A | 1/2020 |

OTHER PUBLICATIONS

Non-final office action mailed Apr. 21, 2022 for Korean Application No. 10-2021-0021134.

X. Wang et al., "Compact Quad-Mode Bandpass Filter Using Modified Coaxial Cavity Resonator With Improved Q-Factor", IEEE Transactions on Microwave Theory and Technologies, vol. 63, No. 3, Mar. 2015.

M. Hoft et al., "Tunable Capacitive Coupling for Cavity Resonator Filters", GeMiC 2009, Mar. 16, 2009-Mar. 18, 2009.

Office Action mailed on Jul. 18, 2023 from the Chinese Patent Office for Chinese Application No. 2023071802631780.

Office Action mailed on Oct. 3, 2023 from the Japanese Patent Office for Japanese Application No. 2022-549939.

Extended European Search Report mailed on Feb. 19, 2024 from the European Patent Office for European Application No. 21757490.4.

Japanese Office Action mailed on Jan. 7, 2025 from the Japanese Patent Office for Application No. 2024-061300.

Xuguang Wang et al., 'Compact Quad-Mode Bandpass Filter Using Modified Coaxial Cavity Resonator With Improved Q-Factor', Transactions on Microwave Theory and Techniques, Mar. 2025, pp. 1-13, vol. 63. No. 3, IEEE.

* cited by examiner (Electric Coupling)

(Magnetic Coupling)

(Electric Coupling)

(Magnetic Coupling)

| SPACING DISTANCE(mm) | Coupling Bandwidth(MHz) | Phase |
|---|---|---|
| 0.0(NO SPACING DISTANCE) | 52 | −90 |
| 0.1 | 164 | +90 |
| 0.2 | 104 | +90 |
| 0.5 | 54 | +90 |
| 1.0 | 40 | +90 |

1. ABSENCE OF SPACING DISTANCE

2. PRESENCE OF SPACING DISTANCE

| SPACING DISTANCE(mm) | Coupling Bandwidth(MHz) | Phase(deg) |
|---|---|---|
| 0.0(NO SPACING DISTANCE) | 4 | −90 |
| 0.1 | 6 | +90 |
| 0.5 | 38 | −90 |
| 1.0 | 42 | −90 |
| 1.5 | 52 | −90 |

1. ABSENCE OF SPACING DISTANCE

2. PRESENCE OF SPACING DISTANCE (a) CAVITY FILTER OF COMPARATIVE EXAMPLE (b) CAVITY FILTER OF PRESENT INVENTION (a) CAVITY FILTER OF COMPARATIVE EXAMPLE (b) CAVITY FILTER OF PRESENT INVENTION

CAVITY FILTER AND MANUFACTURING METHOD THEREFOR

CROSS-REFERENCE TO RELATED APPLICATIONS

This application is a continuation application of International Application No. PCT/KR2021/002048, filed Feb. 18, 2021, which claims the benefit of Korean Patent Application Nos. 10-2020-0020790, filed Feb. 20, 2020; and 10-2021-0021134, filed Feb. 17, 2021, in the Korean Intellectual Property Office, the disclosures of which are incorporated herein in their entirety by reference.

TECHNICAL FIELD

The present invention relates to a cavity filter and a method of manufacturing the same, and more particularly, to a cavity filter, which is easy to manufacture and facilitates transmission zero design by using coupling, and a method of manufacturing the same.

BACKGROUND ART

In general, to improve blocking band attenuation characteristics of a band pass filter (BPF), there is used transmission zero design using electric coupling, magnetic coupling, or mixed coupling between an odd number of resonant elements (cascaded triplet) or an even number of resonant elements (cascaded quadruplet) that are not adjacent to each other.

In general, vertically symmetrical transmission zero of a filter passband occurs when an even number of resonant elements are coupled by cross-coupling, and one transmission zero occurs at a left or right side of the passband depending on the type of coupling (i.e., electric coupling or magnetic coupling) when an odd number of resonant elements are coupled by cross-coupling.

The transmission zero occurring at the left side of the passband by using electric coupling or the vertically symmetrical transmission zero occurring by using electric coupling is called capacitive cross-coupling, and the transmission zero occurring at the right side of the passband by using magnetic coupling is called inductive cross-coupling.

As a general method used to implement capacitive cross-coupling of a cavity filter, the capacitive cross-coupling has been implemented by inserting a component that maximizes the electric coupling between the electric coupling and the magnetic coupling. In this case, in the case of an ultra-small cavity filter, a PCB type component is implemented, and recently, a notch R/B type component has been developed and used.

Disclosure

Technical Problem

An object of the present invention is to provide a cavity filter, which is easy to manufacture, and a method of manufacturing the same.

Another object of the present invention is to provide a cavity filter, which is designed to suppress magnetic coupling and excite electric coupling relatively strongly, and a method of manufacturing the same.

Still another object of the present invention is to provide a cavity filter, which includes a vertical post integrated with a resonant bar without a separate component that maximizes electric coupling, and a method of manufacturing the same.

Technical problems of the present invention are not limited to the aforementioned technical problems, and other technical problems, which are not mentioned above, may be clearly understood by those skilled in the art from the following descriptions.

Technical Solution

An embodiment of the present invention provides a cavity filter including: one side cavity and the other side cavity required to have capacitive cross-coupling design; resonant bars respectively provided at centers of one side cavity and the other side cavity; and a vertical post for a notch extending from any one of the resonant bars and extending in a vertical direction in an inner wall that is a boundary between one side cavity and the other side cavity, in which the resonant bar, which is connected to the vertical post for a notch among the resonant bars, is integrated with the vertical post for a notch.

In this case, the cavity filter may further include a horizontal portion configured to mediate connection between the vertical post for a notch and the resonant bar, and the horizontal portion may be integrated with the vertical post for a notch.

In addition, the resonant bars, the vertical post for a notch, and the horizontal portion may be integrally injection molded and then partially cut.

In addition, the cavity filter may further include a filter upper cover configured to cover open upper sides of one side cavity and the other side cavity, and an upper portion of the vertical post for a notch may be in contact with a lower surface of the filter upper cover within a range of assembly tolerance.

In addition, one side cavity and the other side cavity may be coupled by inductive cross-coupling instead of capacitive cross-coupling and frequency filtering characteristics may be inverted from a moment when a spacing distance between the filter upper cover and an upper end of the vertical post for a notch exceeds the range of assembly tolerance.

In addition, the spacing distance may be set to below 0.1 mm.

In addition, a lower end of the horizontal portion including a lower end of the vertical post for a notch may be spaced apart from the bottom surfaces of one side cavity and the other side cavity at a predetermined distance.

In addition, one side cavity and the other side cavity may be coupled by inductive cross-coupling instead of capacitive cross-coupling when the lower end of the horizontal portion including the lower end of the vertical post for a notch is in contact with the bottom surfaces of one side cavity and the other side cavity, and a phase value may be inverted to a (−) value, and one side cavity and the other side cavity may be coupled by the capacitive cross-coupling from a moment when the lower end of the horizontal portion including the lower end of the vertical post for a notch is spaced apart from the bottom surfaces of one side cavity and the other side cavity.

In addition, a coupling bandwidth of the capacitive cross-coupling may gradually increase as a spacing distance between the lower end of the horizontal portion including the lower end of the vertical post for a notch and the bottom surfaces of one side cavity and the other side cavity increases.

The vertical post for a notch may have a rod or bar shape having a circular or polygonal horizontal cross-section, and the horizontal portion may have a width corresponding to an outer diameter of the vertical post for a notch and have a quadrangular bar shape having a predetermined thickness in an upward/downward direction.

An interval adjustment post may be further formed integrally with the vertical post for a notch and extend by a predetermined length toward the resonant bar that is not connected among the resonant bars associated with the capacitive cross-coupling.

An extension direction of the horizontal portion may be orthogonal to an extension direction of the vertical post for a notch.

Another embodiment of the present invention provides a method of manufacturing a cavity filter, the method including: an injection molding step of integrally injection molding resonant bars associated with one side cavity and the other side cavity required to have capacitive cross-coupling design, a horizontal portion extending in a horizontal direction from any one of the resonant bars, and a vertical post for a notch extending upward orthogonally from a tip of the horizontal portion so that the resonant bars, the horizontal portion, and the vertical post are not separated; a cavity separation step of separating the horizontal portion from bottom surfaces of the two cavities by partially cutting the bottom surfaces, which connect the two cavities, after the injection molding step; a component installation step of coupling tuning plates, which interact with tuning screws for frequency tuning to upper ends of the resonant bars after the cavity separation step; and a cover coupling step of coupling a filter lower cover and a filter upper cover to cover, by the filter lower cover, the part cut in the cavity separation step and cover, by the filter upper cover, open upper sides of the cavities after the component installation step.

In this case, the injection molding step may be a step of performing integral injection molding by using a lower stationary mold and an upper movable mold that is movable downward from above the lower stationary mold and has a shape frame having a space defined between the lower stationary mold and the upper movable mold so that a predetermined molten material is injected into the space and cured in the space.

Advantageous Effects

The cavity filter and the method of manufacturing the same according to the present invention may achieve the following various effects.

First, because the process of manufacturing and assembling separate components for designing capacitive cross-coupling is eliminated, the product may be easily manufactured.

Second, because it is possible to derive frequency filtering characteristics equally corresponding to a design value of capacitive cross-coupling made by manufacturing and assembling the separate components, the filter design may be very easily performed.

EXPLANATION OF REFERENCE NUMERALS AND SYMBOLS

Figure 1:
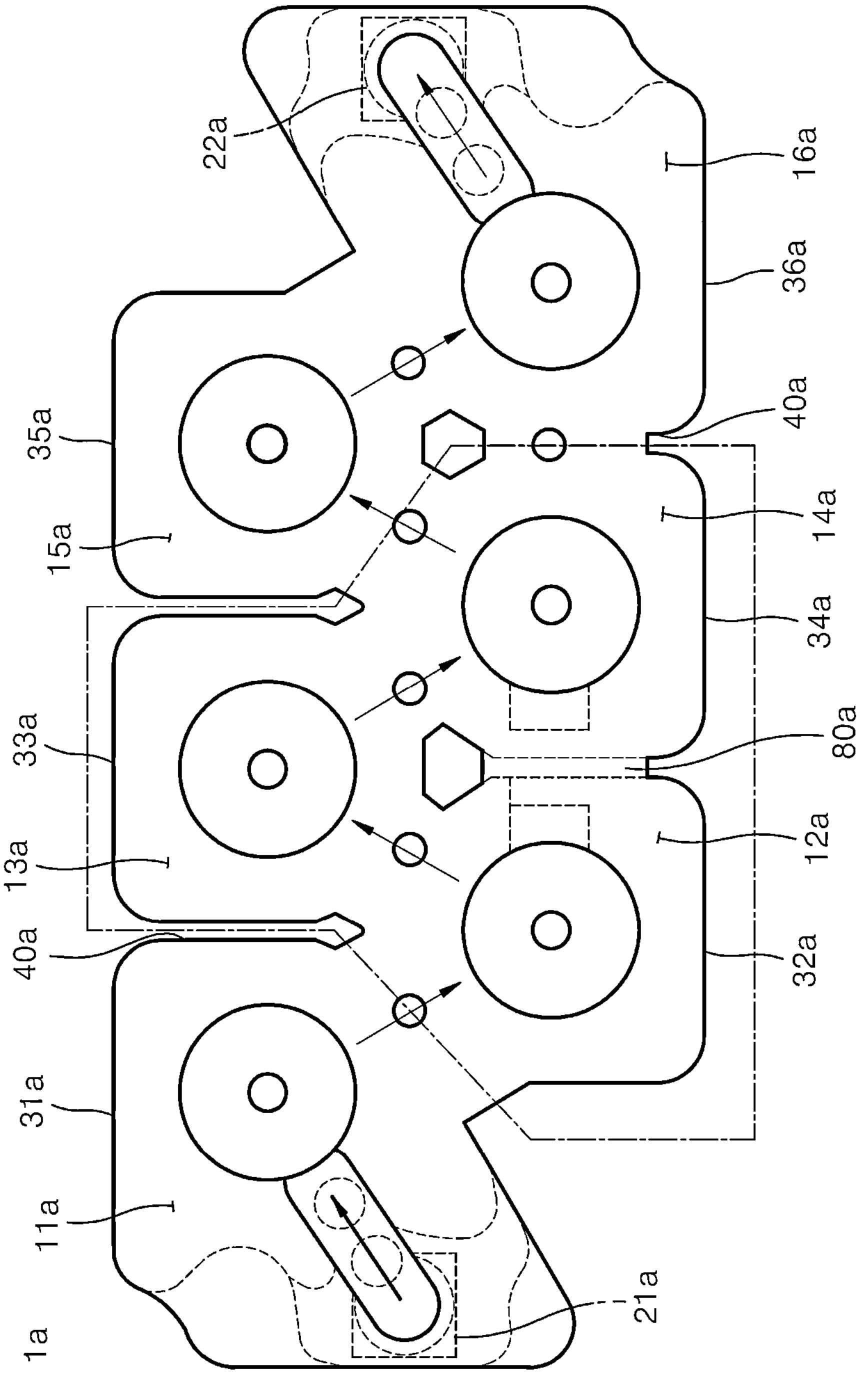
FIG. 1 is a top plan view illustrating a cavity filter in the related art that is compared with an embodiment of a cavity filter according to the present invention.

1*a*: Cavity filter of comparative example
1: Cavity filter of present invention
11 to 16: Cavities
21: Input connector
22: Output connector
31 to 36: Resonance blocks
40: Partition wall
51 to 56: Resonant bars
61 to 66: Tuning plates
70: Horizontal portion
80: Vertical post for notch
90: Filter upper cover
95: Filter lower cover

BEST MODE

Hereinafter, embodiments of a cavity filter and a method of manufacturing the same according to the present invention will be described in detail with reference to the accompanying drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

FIG. 1 is a top plan view illustrating a cavity filter that is compared with an embodiment of a cavity filter according to the present invention.

Prior to the specific description of one embodiment of a cavity filter and a method of manufacturing the same according to the present invention, a cavity filter 1*a* according to a comparative example will be described first to assist in understanding the embodiment of the present invention.

Referring to FIG. 1, the cavity filter 1*a* according to the comparative example has a structure in which dielectric or metallic resonators are connected in multiple stages in a plurality of cavities 11*a* to 16*a* having spaces defined by a metal housing (and a cover, and the like). For the convenience of description, the configuration of the metal housing is not illustrated, and the description of the metal housing will be omitted. However, an external appearance of the cavity filter 1*a* according to the comparative example or an inner wall 10 of the cavity may be understood as being divided by the metal housing.

More specifically, as illustrated in FIG. 1, the cavity filter 1*a* according to the comparative example has a structure in which a first cavity 11*a*, a second cavity 12*a*, a third cavity 13*a*, a fourth cavity 14*a*, a fifth cavity 15*a*, and a sixth cavity 16*a* are coupled to one another. A first resonant bar 51*a*, a second resonant bar 52*a*, a third resonant bar 53*a*, a fourth resonant bar 54*a*, a fifth resonant bar 55*a*, and a sixth resonant bar 56*a* may be respectively embedded in a vertical direction in the cavities 11*a* to 16*a*. Hereinafter, for the convenience, the respective cavities 11*a* to 16*a* may be understood as serving as a first resonator, a second resonator, a third resonator, a fourth resonator, a fifth resonator, and a sixth resonator.

The first resonator of the first cavity 11*a* may be connected to an input connector 21*a* configured to receive an input signal, and the sixth resonator of the sixth cavity 16*a* may be connected to an output connector 22*a* configured to provide an output signal. Therefore, as indicated by the arrow in FIG. 1, a signal inputted to the input connector 21*a* sequentially passes through the first resonator, the second resonator, the third resonator, the fourth resonator, the fifth resonator, and the sixth resonator and is outputted to the output connector 22*a*.

In general, in the case of a filter having no separate notch structure, only sequential coupling basically occurs between the adjacent resonators in open sections between the resonators. In contrast, as illustrated in FIG. 1, cross-coupling may occur between the resonators that are not adjacent to each other between the second resonator and the fourth resonator by a notch structure (metal rod, 50*a*) positioned between the second cavity 12*a* and the fourth cavity 14*a*.

However, to form capacitive cross-coupling between the second cavity 12*a* and the fourth cavity 14*a*, the cavity filter 1*a* according to the comparative example may be installed to have a structure in which the metal rod 50*a* penetrates the inner wall 10. In this case, to electrically isolate the metal rod 50*a* from the inner wall 10, an outer portion of the metal rod 50*a* needs to be surrounded by a support structure made of a dielectric material (not illustrated) such as Teflon and then coupled to the inner wall 10. In this case, a portion of the inner wall 10 on which the metal rod 50*a* is installed may have a through-hole structure or be installed at a lower end. However, it may not be easy to form the through-hole in the inner wall 10 during a process of manufacturing the cavity filter. Therefore, it is necessary to perform a complicated process in which an upper end of the inner wall 10 is cut, the metal rod 50*a* surrounded by the support structure for insulation is installed on the cut portion, and then the support structure is fixedly fitted with a shape of the cut portion of the inner wall 10.

A cavity filter 1 and a method of manufacturing the same according to the present invention provide an advantage that allows a manufacturer to very simply manufacture the cavity filter 1 in comparison with the cavity filter 1*a* according to the comparative example, while deriving frequency filter characteristics identical or similar to the cavity filter 1*a* according to the comparative example described above.

Figure 2:
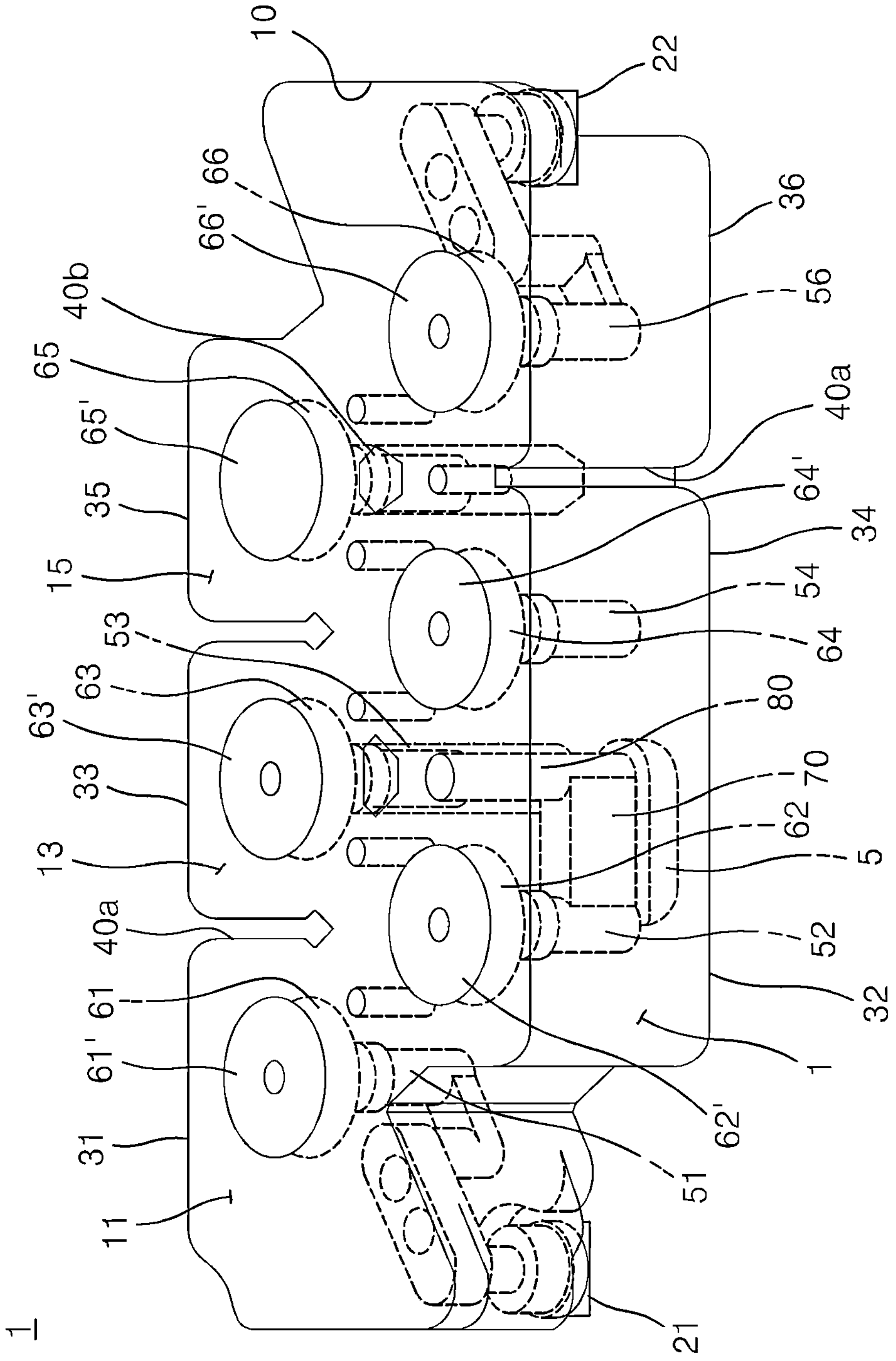
FIG. 2 is a perspective projection view illustrating the embodiment of the cavity filter according to the present invention.
Figure 3:
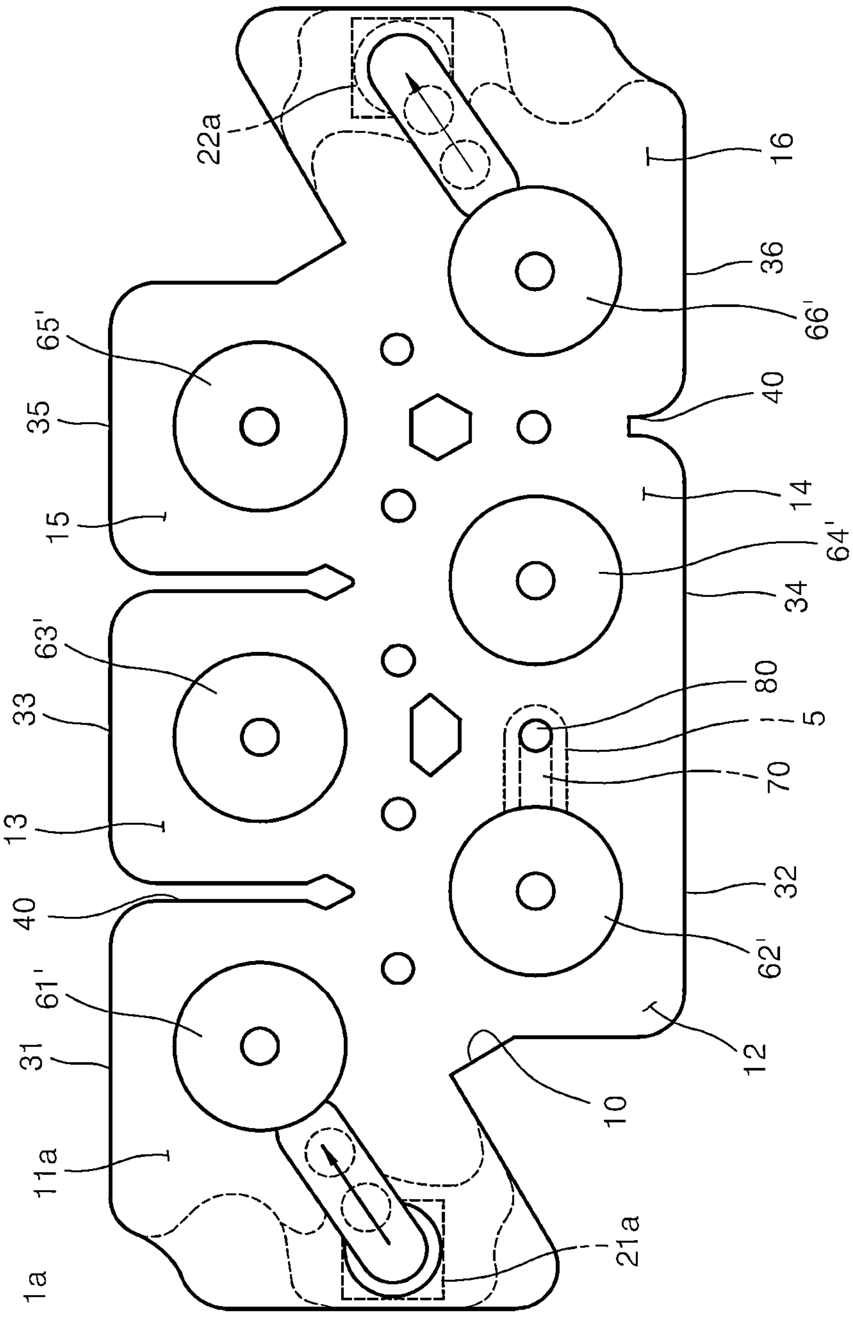
FIG. 3 is a top plan view of FIG. 1.
Figure 4:
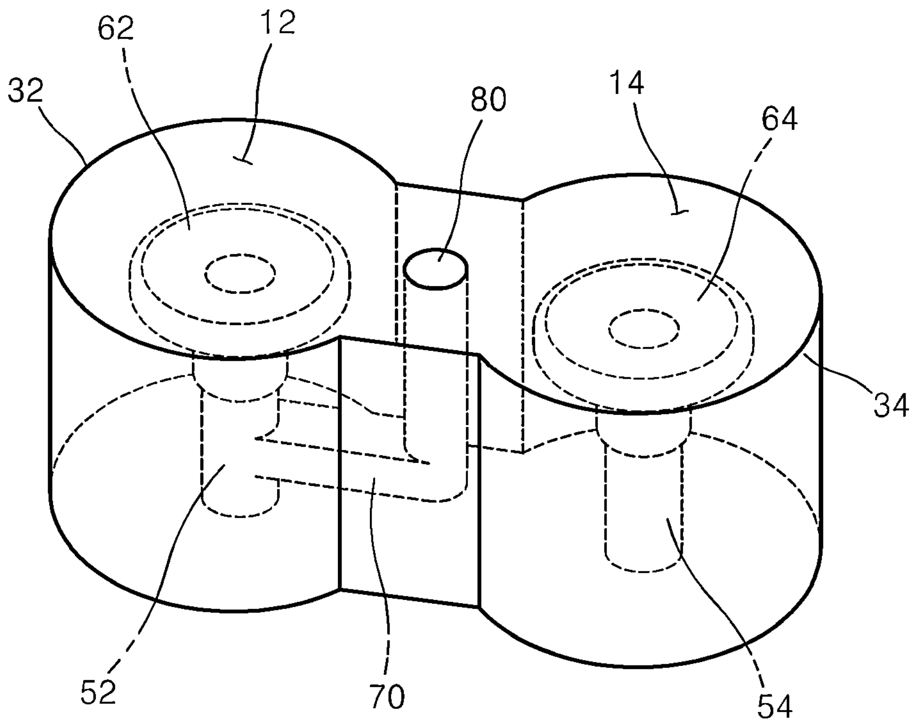
FIG. 4 is a perspective view illustrating a second resonator and a fourth resonator associated with capacitive cross-coupling among the components in FIGS. 2 and 3.
Figure 5:
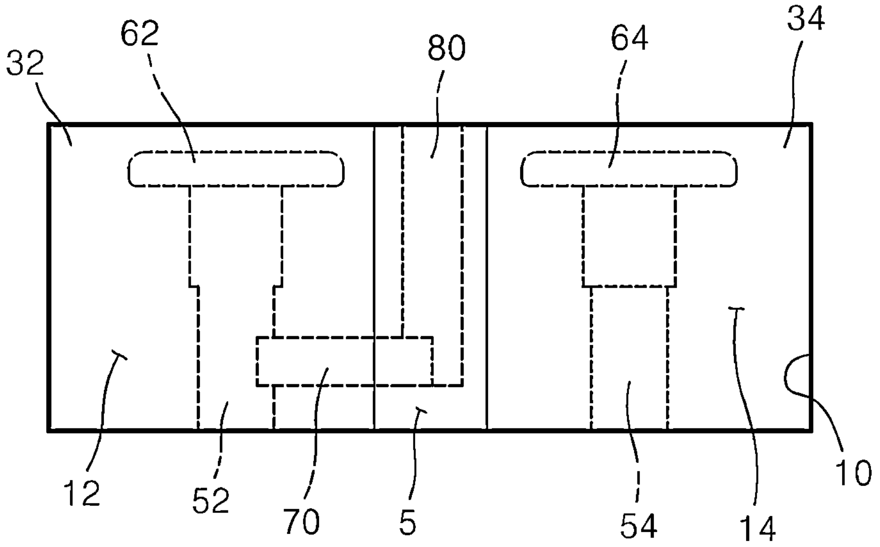
FIG. 5 is a front view of FIG. 4.
Figure 6:
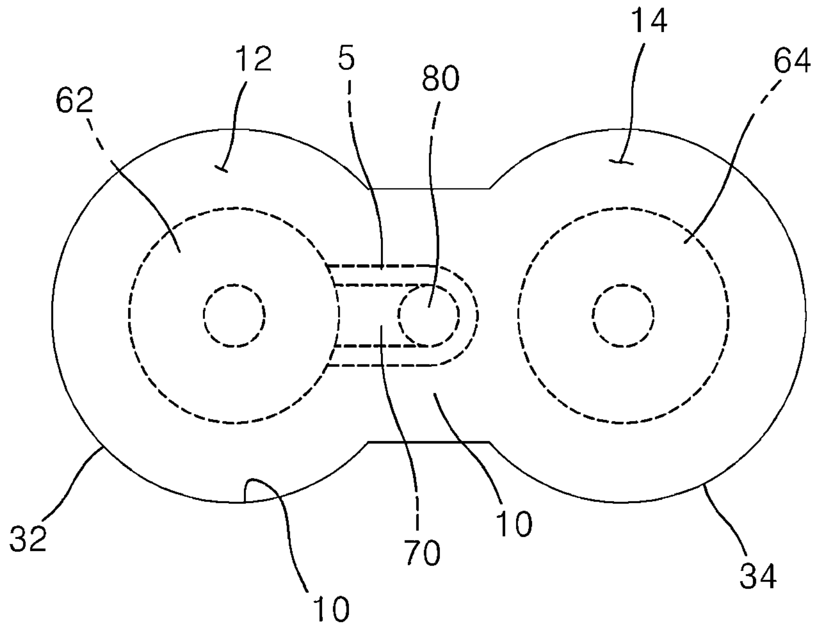
FIG. 6 is a top plan view of FIG. 4.
Figure 7A:
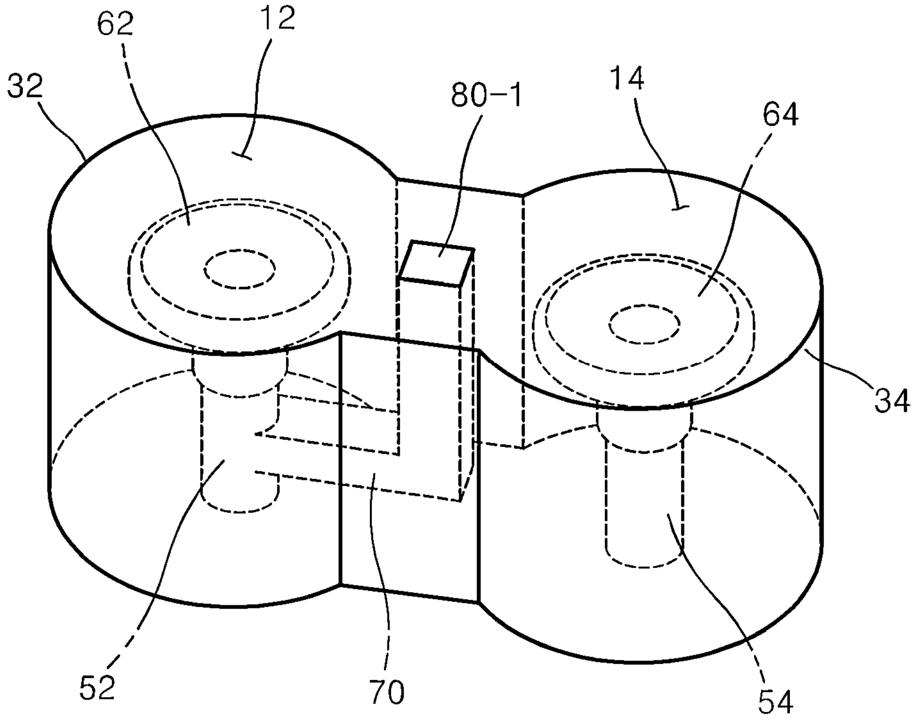
FIGS. 7A and 7B are perspective projection views illustrating various embodiments of a vertical post for a notch among the components in FIG. 2.
Figure 7B:
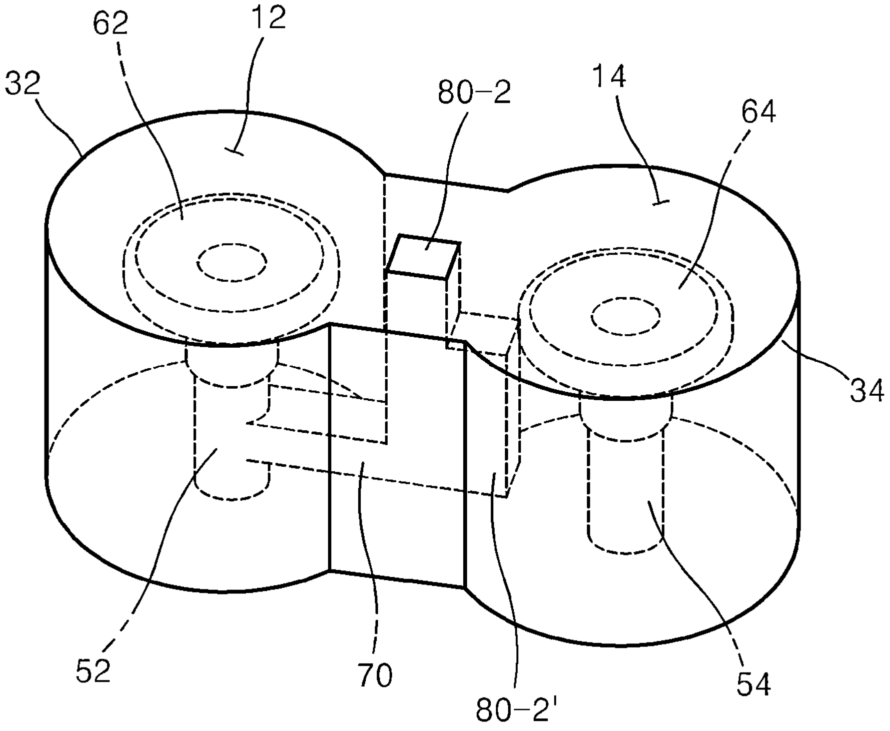

FIG. 2 is a perspective projection view illustrating the embodiment of the cavity filter according to the present invention, FIG. 3 is a top plan view of FIG. 1, FIG. 4 is a perspective view illustrating a second resonator and a fourth resonator associated with cross-coupling among the components in FIGS. 2 and 3, FIG. 5 is a front view of FIG. 4, FIG. 6 is a top plan view of FIG. 4, and FIGS. 7A and 7B are perspective projection views illustrating various embodiments of a vertical post for a notch among the components in FIG. 2.

As illustrated in FIGS. 2 and 3, one embodiment 1 of the cavity filter according to the present invention includes cavities 11 to 16 provided in the form of a plurality of block units. The cavities 11 to 16 are each provided in the form of a space or block having a vacant internal space or filled with a dielectric material having predetermined permittivity. Hereinafter, the cavity will be described as being limited to a space (cavity) considering that air is also a dielectric material having predetermined permittivity. In addition, a part for dividing or separating the space may be configured as a metal housing may be made of a metallic material. However, in the present invention, a specific structure of the metal housing is not illustrated. However, the specific structure of the metal housing will be briefly described with reference to FIGS. 13A to 13D when one embodiment of the method of manufacturing the cavity filter according to the present invention is described.

One embodiment 1 of the cavity filter according to the present invention includes a first cavity 11 positioned at a left upper side in FIG. 3, a second cavity 12 disposed to define an open section in a diagonal direction at a right lower side of the first cavity 11, a third cavity 13 disposed to define an open section in the diagonal direction at a right upper side of the second cavity 12, a fourth cavity 14 disposed to define an open section in the diagonal direction at a right lower side of the third cavity 13, a fifth cavity disposed to define an open section in the diagonal direction at a right upper side of the fourth cavity 14, and a sixth cavity 16 disposed to define an open section in the diagonal direction at a right lower side of the fifth cavity 15.

Resonant bars 51 to 56 are respectively embedded in central portions of bottom surfaces of the first to sixth cavities 11 to 16, and the resonant bars 51 to 56 will be referred to as first to sixth resonant bars 51 to 56, for the convenience. Further, a block shape of a portion including the first cavity 11 in which the first resonant bar 51 is provided may be referred to as a first resonance block 31, and the other cavities 12 to 16 will be referred to as a second resonance block 32 and the like in a sequential manner.

An input connector 21 configured to input an input signal may be connected to the first resonant bar 51 of the first cavity 11 corresponding to the first resonance block 31, and an output connector 22 configured to provide an output signal may be connected to the sixth resonant bar 56 of the sixth cavity 16 corresponding to the sixth resonance block 36.

Circular first to sixth tuning plates 61 to 66 may be respectively installed at upper ends of the first to sixth resonant bars 51 to 56 and spaced apart from a lower surface of a filter upper cover 90 to be described below at a predetermined distance.

Further, as illustrated in FIG. 4, tuning plates 61' to 66' may be respectively installed on upper portions of the first to sixth resonant bars 51 to 56 and assembled to the filter upper cover 90 disposed to cover upper sides of the first to sixth cavities 11 to 16. The tuning plates 61' to 66' enable frequency tuning by using non-illustrated tuning screws provided to perform the frequency tuning. The tuning plates 61' to 66' may be integrated with the filter upper cover 90. Of course, the tuning plates 61' to 66' may be separately manufactured and coupled to the corresponding portions of the filter upper cover 90. In this case, separation spaces between lower surfaces of the tuning plates 61' to 66' and the first to sixth tuning plates 61 to 66 may enable fine frequency tuning adjustment by fine changes in shapes changed by a tuning process performed on the tuning plates 61' to 66' by a designer.

Meanwhile, as illustrated in FIGS. 2 and 3, one embodiment of the cavity filter according to the present invention may further include a vertical post 80 for a notch positioned in the inner wall 10 between the second cavity 12 and the fourth cavity 14 to form capacitive cross-coupling between the second cavity 12 and the fourth cavity 14.

In the embodiment of the present invention, the vertical post 80 for a notch is restrictively described as being formed at the position for forming the capacitive cross-coupling between the second cavity 12 and the fourth cavity 14. However, the vertical post 80 for a notch may be positioned between the first cavity 11 and the third cavity 13, between the third cavity 13 and the fifth cavity 15, and between the fourth cavity 14 and the sixth cavity 16 as long as an odd number of resonators are coupled by cross-coupling without being connected through the open sections. In this case, designs of partition walls 40, 40*a*, and 40*b*, which will be described below and is provided to define boundaries or open sections between the respective resonance blocks 31 to 36, may of course be changed.

As illustrated in FIGS. 2 and 3, the partition walls 40 may include outer partition walls 40*a* each formed so that a part of a sidewall is recessed inward, and inner partition walls 40*b* each formed to be recessed inward in an upward/downward direction in the cavities 11 to 16.

The vertical post 80 for a notch may be defined as a component positioned between any one side cavity 12 (see the second cavity 12 in FIGS. 2 and 3) and the inner wall 10 of the other side cavity 14 (see the fourth cavity 14 in FIGS. 2 and 3) positioned across the odd number of resonators without being connected to one side cavity 12 through the open section in the plurality of resonance blocks 31 to 36.

More specifically, as illustrated in FIGS. 4 to 6, the vertical post 80 for a notch may be provided between one side cavity (the second cavity 12) and the other side cavity (the fourth cavity 14) and disposed in the vertical direction. In this case, the vertical post 80 for a notch may be disposed between boundary lines that connect the inner partition wall 40*b* (see FIG. 3) and the inner wall 10 corresponding to a boundary between one side cavity (the second cavity 12) and the other side cavity (the fourth cavity 14).

In addition, as illustrated in FIGS. 4 to 6, the vertical post 80 for a notch may be provided in the form of a bar having a circular horizontal cross-section.

In this case, as illustrated in FIGS. 4 and 5, an extension direction of a tip of a horizontal portion 70 may be orthogonal to an extension direction of an upper end of the vertical post 80 for a notch.

Further, as illustrated in FIGS. 4 to 6, the lower end of the vertical post 80 for a notch may be orthogonally connected to the tip of the horizontal portion 70 horizontally extending from a part of an outer peripheral surface of the resonant bar (the second resonant bar 52) of one side cavity (the second cavity 12). As illustrated in FIG. 4, the horizontal portion 70 may have a width approximately corresponding to an outer diameter of the second resonant bar 52 and have a quadrangular bar shape having a predetermined thickness in the vertical direction.

Meanwhile, as illustrated in FIGS. 7A and 7B, vertical posts 80-1 and 80-2 for notches may each have a quadrangular horizontal cross-section. That is, the horizontal cross-sectional shape of each of the vertical posts 80-1 and 80-2 for notches is not necessarily limited to the circular horizontal cross-section, as illustrated in FIGS. 2 to 6. As illustrated in FIGS. 7A and 7B, the vertical posts 80-1 and 80-2 for notches may each have a polygonal, i.e., quadrangular horizontal cross-section or a non-illustrated particular cross-sectional shape and derive the same characteristics within a range in which upper ends of the vertical posts 80-1 and 80-2 for notches adjoin the lower surface of the filter upper cover 90.

Further, as illustrated in FIG. 7B, an interval adjustment post 80-2' may be further formed integrally with the vertical post 80-2 for a notch and extend by a predetermined length toward the opposite resonator (i.e., the fourth resonant bar 54) to adjust an interval with the opposite resonator (i.e., the fourth resonant bar 54) associated with the capacitive cross-coupling. The size of the capacitive cross-coupling may be appropriately adjusted by adjusting the interval between the interval adjustment post 80-2' and the fourth resonant bar 54.

In the cavity filter according to the embodiment of the present invention, the resonant bar (the second resonant bar 52) of one side cavity (the second cavity 12), the horizontal portion 70, and the vertical post 80 for a notch may be made of the same material and integrated by injection molding. Further, the resonant bar (the second resonant bar 52), the horizontal portion 70, and the vertical post 80 for a notch may be made of the same material as the non-illustrated metal housing. As illustrated in FIGS. 13A to 13D to be described below, the resonant bar (the second resonant bar 52), the horizontal portion 70, and the vertical post 80 for a notch may be integrated by injection molding at the same time when the metal housing is manufactured. This configuration will be described more specifically when the method of manufacturing the cavity filter according to the embodiment of the present invention is described.

Figure 8A:
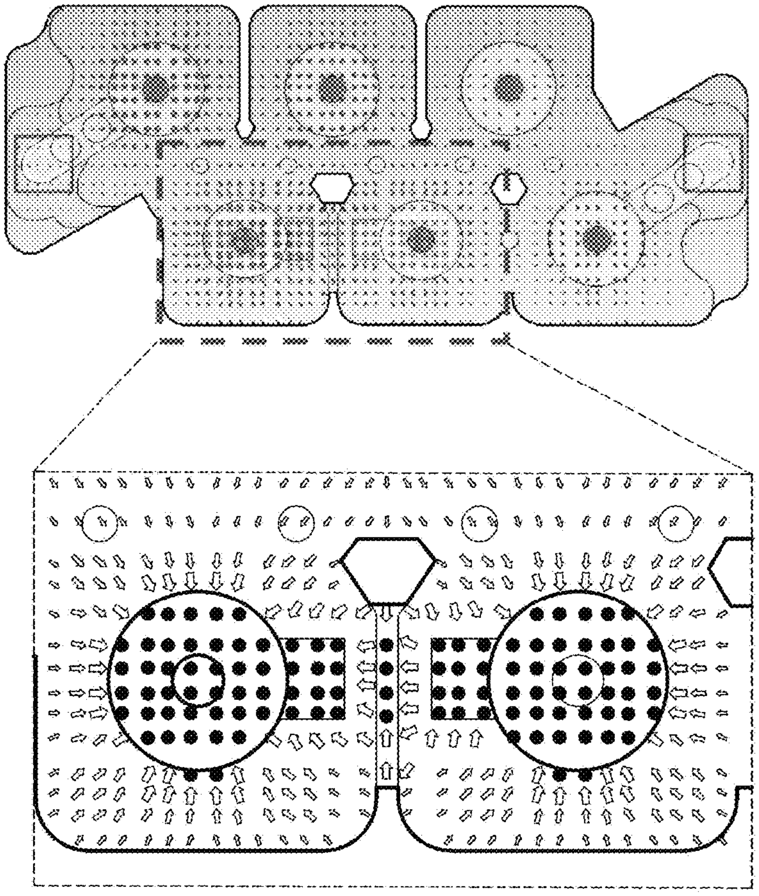
FIGS. 8A and 8B are views for comparing an electric field distribution diagram and a magnetic field distribution diagram implemented by a cavity filter of a comparative example.
Figure 8B:
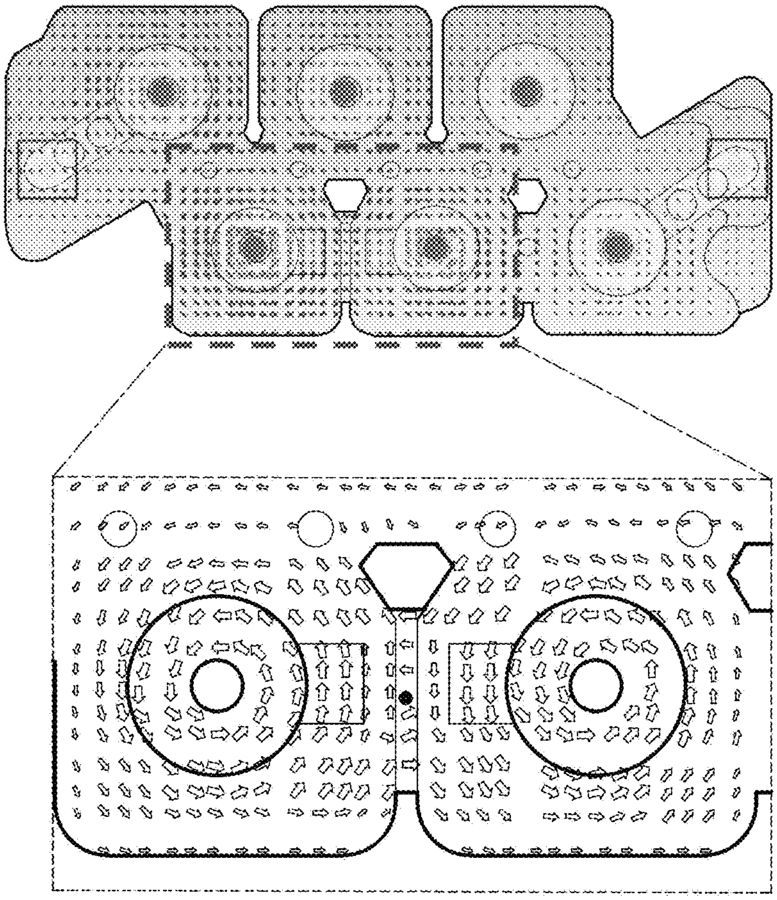
Figure 9A:
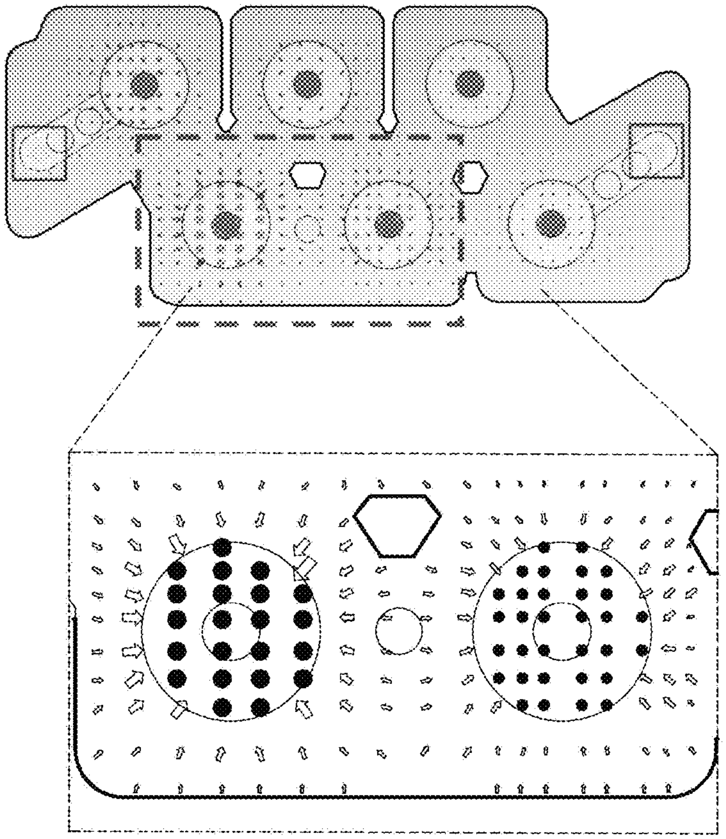
FIGS. 9A and 9B are views for comparing an electric field distribution diagram and a magnetic field distribution diagram implemented in one embodiment of the cavity filter according to the present invention.
Figure 9B:
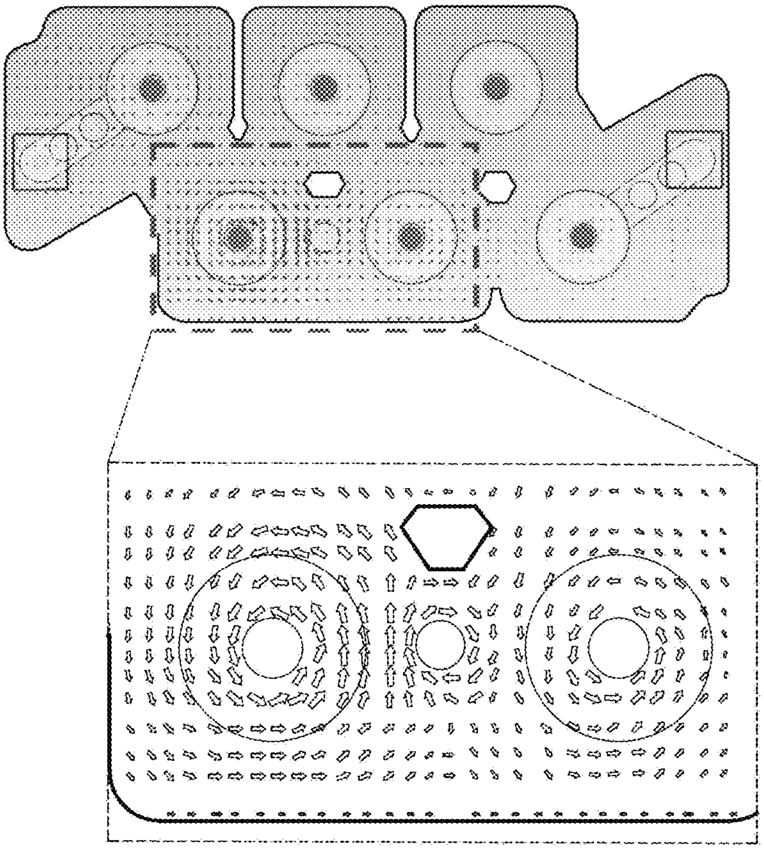
Figure 10A:
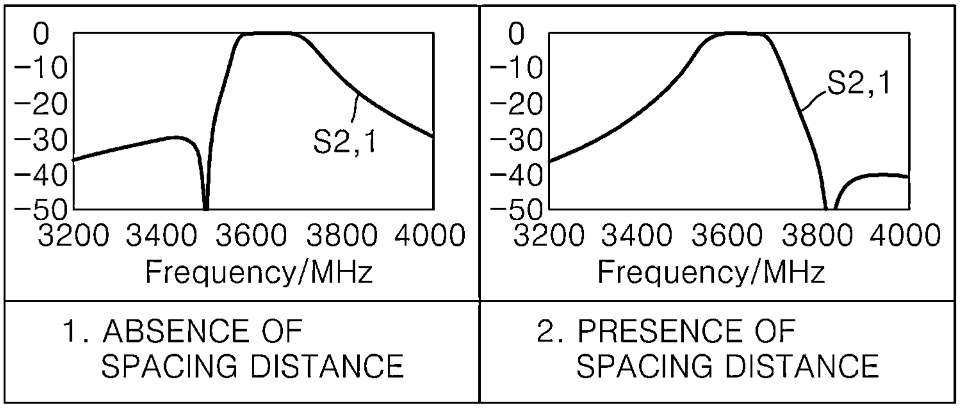
FIGS. 10A and 10B are graphs illustrating changes in frequency filtering characteristics depending on shapes of the vertical post for a notch among the components in FIG. 5.
Figure 10B:
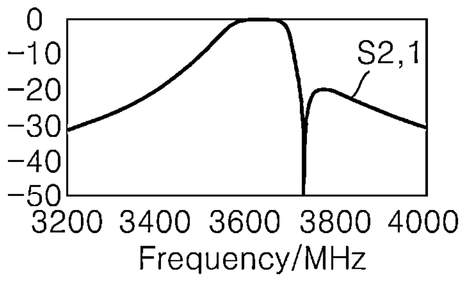
Figure 10B:
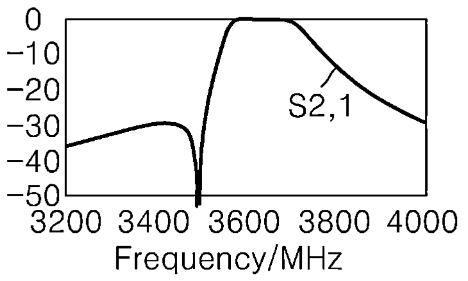

FIGS. 8A and 8B are views for comparing an electric field distribution diagram and a magnetic field distribution diagram implemented by the cavity filter 1 of the comparative example, FIGS. 9A and 9B are views for comparing an electric field distribution diagram and a magnetic field distribution diagram implemented in one embodiment of the cavity filter according to the present invention, and FIGS. 10A and 10B are graphs illustrating changes in frequency filtering characteristics depending on shapes of the vertical post 80 for a notch among the components in FIG. 5.

As illustrated in FIGS. 4 to 6, in one embodiment 1 of the cavity filter according to the present invention, in the case in which the vertical post 80 for a notch extends in the horizontal direction by means of the horizontal portion 70 from the second resonant bar 52 of any one (the second cavity 12 in the present embodiment) of one side cavity (the second cavity 12) and the other side cavity (the fourth cavity 14) and then extends in the vertical direction between the respective cavities, the changes of the electric field distribution diagram and the magnetic field distribution diagram may be ascertained in comparison with the cavity filter 1*a* according to the comparative example.

FIGS. 8A and 8B are the electric field distribution diagram and the magnetic field distribution diagram of the cavity filter 1*a* according to the comparative example, and it can be seen that the second cavity 12 and the fourth cavity 14 are uniformly coupled to each other by electric coupling and magnetic coupling when the electric coupling and the magnetic coupling are implemented between the second cavity 12 and the fourth cavity 14.

In this case, FIGS. 9A and 9B are the electric field distribution diagram and the magnetic field distribution diagram implemented by one embodiment 1 of the cavity filter according to the present invention. It can be seen that strong magnetic coupling occurs between the vertical post 80 for a notch and the second cavity 12 having the second resonant bar 52 connected to the vertical post 80 for a notch, such that only the relatively strong electric coupling components are present, whereas magnetic coupling components with the fourth resonant bar 54 of the opposite fourth cavity 14, on which original cross-coupling needs to occur, are maximally suppressed.

As described above, the cavity filter according to the present invention is advantageous in easily implementing the capacitive cross-coupling only by using the shape designs of the vertical post 80 for a notch and the horizontal portion 70 integrated with the second resonant bar 52 without an additional particular component.

Meanwhile, as illustrated in FIG. 5, the vertical post 80 for a notch may extend to a height at which the upper end of the vertical post 80 for a notch is in contact with the lower surface of the filter upper cover 90 positioned at the upper side of the vertical post 80 for a notch.

However, the upper end of the vertical post 80 for a notch need not necessarily physically be in contact with the lower surface of the filter upper cover 90, and a spacing distance may be allowed in consideration of assembly tolerance with the filter upper cover 90. However, the spacing distance from the lower surface of the filter upper cover 90, which is set based on the assembly tolerance, need not exceed a preset distance.

According to the result of tests executed by the applicant of the present invention, as illustrated in the left view in FIG. 10A, a phase value is formed as a (−) value when the upper end of the vertical post 80 for a notch is in contact with the lower surface of the filter upper cover 90, such that the capacitive cross-coupling (i.e., electric coupling) desired by the designer is implemented. However, as illustrated in the right view in FIG. 10A, the phase value is inverted to a (+) value when a spacing distance is present between the filter upper cover 90 and the upper end of the vertical post 80 for a notch within a region deviating from the minimum assembly tolerance, such that the inductive cross-coupling (i.e., magnetic coupling) is implemented instead of the capacitive cross-coupling desired by the designer, and as a result, the frequency filtering characteristics may be inverted. In this case, an allowance range of the assembly tolerance need to be set to below 0.1 mm because the phase value is not yet inverted to a (+) value.

Meanwhile, as illustrated in FIG. 5, the lower end of the vertical post 80 for a notch and the lower end of the horizontal portion 70 including the same may be spaced apart from an inner bottom surface of the cavity (the second cavity 12) at a predetermined distance.

The predetermined distance may mean a distance by which the lower end of the vertical post 80 for a notch and the lower end of the horizontal portion 70 including the same are not in physical contact with the inner bottom surface of the cavity (the second cavity 12).

According to the result of tests executed by the applicant of the present invention, as illustrated in FIG. 10B, the phase value is formed as a (+) value when the lower end of the vertical post 80 for a notch and the lower end of the horizontal portion 70 including the same are in contact with the bottom surface of the cavity (the second cavity 12) (i.e., when the spacing distance is 0), such that the inductive cross-coupling (i.e., magnetic coupling) may be implemented instead of the capacitive cross-coupling desired by the designer. The phase value is inverted to a (−) value from the moment when the lower end of the vertical post 80 for a notch and the lower end of the horizontal portion 70 including the same are spaced apart from the bottom surface of the cavity (the second cavity 12) (i.e., when the spacing distance is 0.1 mm or more), such that the capacitive cross-coupling (i.e., electric coupling) desired by the designer may be implemented. Further, it can be ascertained that as the spacing distance between the cavity (the second cavity 12) and the lower end of the vertical post 80 for a notch and the lower end of the horizontal portion 70 including the same increases, the electric coupling is strongly excited, and the coupling bandwidth is gradually increased.

As described above, in the cavity filter according to the embodiment of the present invention, the capacitive cross-coupling (C-coupling) may be implemented through the electric coupling only when two conditions are satisfied in which the upper end of the vertical post 80 for a notch is necessarily in contact with the lower surface of the filter upper cover 90 within the range of the assembly tolerance (hereinafter, referred to as a 'first condition') and the lower end of the vertical post 80 for a notch and the lower end of the horizontal portion 70 including the same are spaced apart from the bottom surface of the cavity (the second cavity 12) (hereinafter, referred to as a 'second condition').

In contrast, in a case in which at least any one of the first and second conditions is not satisfied (i.e., a case in which the first condition is satisfied but the second condition is not satisfied, a case in which the second condition is satisfied but the first condition is not satisfied, or a case in which all the first and second conditions are not satisfied), the inductive cross-coupling (L-coupling) is implemented through the magnetic coupling instead of the capacitive cross-coupling (C-coupling).

Figure 11:
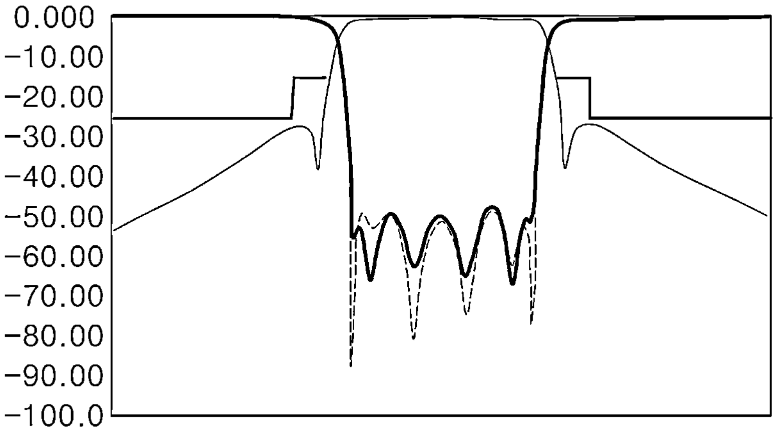
FIG. 11 is a graph for comparing frequency filtering characteristics of the respective cavity filters in FIGS. 1 and 3.
Figure 11:
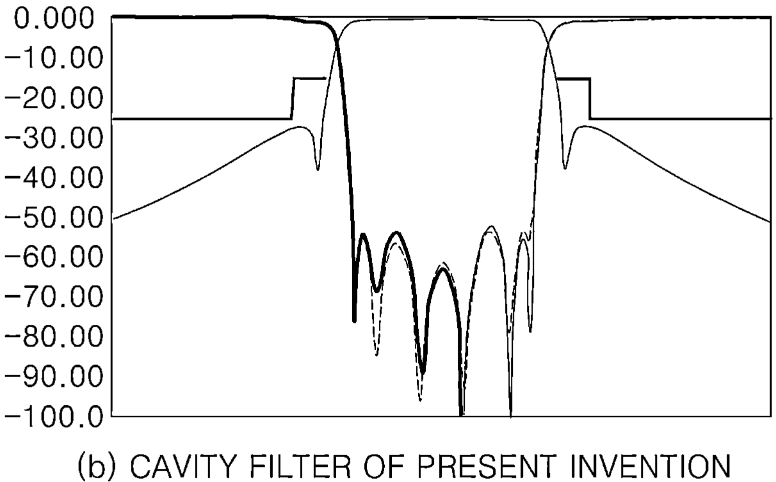
Figure 12:
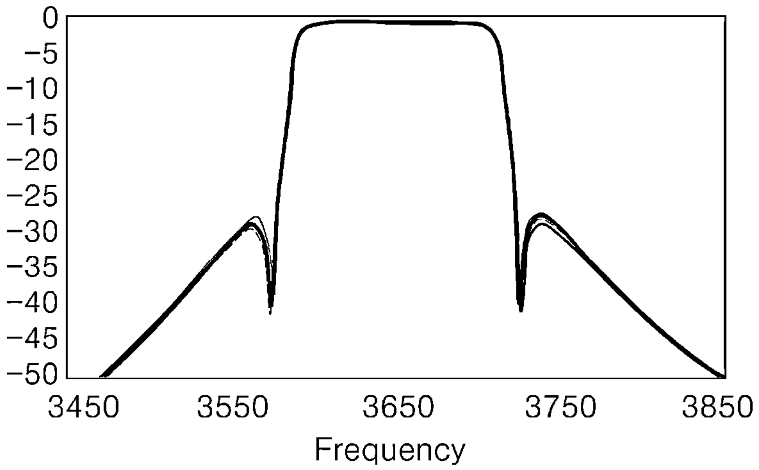
FIG. 12 is a graph for comparing level deviations of the respective cavity filters in FIGS. 1 and 3.
Figure 12:
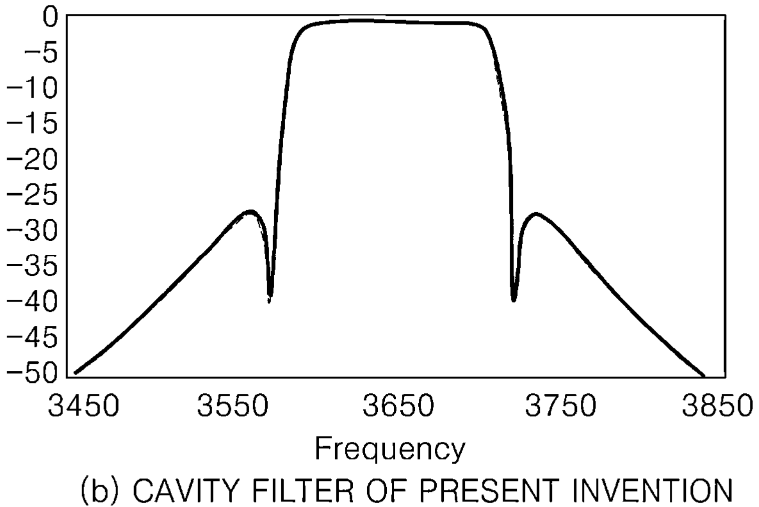

FIG. 11 is a graph for comparing frequency filtering characteristics of the respective cavity filters in FIGS. 1 and 3, and FIG. 12 is a graph for comparing level deviations of the respective cavity filters in FIGS. 1 and 3.

Referring to FIG. 11 (particularly, referring to FIG. 11B), it can be seen that in the case of the cavity filter 1 according to the embodiment of the present invention, a C-notch and an L-notch are respectively formed at the left and right sides of bands by the electric coupling and the magnetic coupling between the second cavity 12 and the fourth cavity 14. The difference in insertion loss is very similar in comparison with the graph illustrating frequency filtering characteristics of the cavity filter 1*a* according to the comparative example.

It is possible to infer that both the cavity filter 1*a* according to the comparative example and the cavity filter 1 according to the embodiment of the present invention have quality factors (Q) values at the equal level.

In addition, referring to FIG. 12, it can be ascertained that the cavity filter (b) according to the embodiment of the present invention has very uniform level deviations of the capacitive cross-coupling in comparison with the cavity filter (a) according to the comparative example. This is because the assembly tolerance of the component is eliminated, which makes it possible to implement the capacitive cross-coupling at a constant level in comparison with the cavity filter (a) according to the comparative example.

FIGS. 13A to 13D are cross-sectional front views illustrating the method of manufacturing the cavity filter according to the embodiment of the present invention.

The method of manufacturing the cavity filter according to the embodiment of the present invention configured as described above will be described below with reference to the accompanying drawings (particularly, FIGS. 13A to 13D).

As illustrated in FIGS. 13A to 13D, in the method of manufacturing the cavity filter according to the embodiment of the present invention, the cavity filter may be manufactured by: manufacturing a molten material by injection molding so that the horizontal portion 70 and the vertical post 80 for a notch, which are made of the same material as the resonant bars, are integrated (an injection molding step to be described below); cutting a part of the element of one side cavity (particularly, the second cavity 12) and a part of the element of the other side cavity (particularly, the fourth cavity 14) so that the elements are separated (a cavity separation step to be described below); fixing corresponding tuning plates to the upper ends of the resonant bars of the cavities (i.e., the upper end of the second resonant bar 52 of the second cavity 12 and the upper end of the fourth resonant bar 54 of the fourth cavity 14) (a component installation step to be described below); and coupling a filter lower cover 95, which covers the cut part, and the filter upper cover 90 that covers the upper sides of the cavities 12 and 14 (a cover coupling step to be described below).

That is, the method of manufacturing the cavity filter according to the embodiment of the present invention may include: an injection molding step of integrally injection molding the vertical post 80 for a notch, the horizontal portion 70, and the resonant bars associated with the two cavities required to at least have capacitive cross-coupling design so that the vertical post 80 for a notch, the horizontal portion 70, and the resonant bars are not separated from one another; a cavity separation step of separating the cavities by cutting a part of the bottom surface, which connect the two cavities, after the injection molding step; a component installation step of coupling the tuning plates 61 to 66, which are main components, to the respective upper ends of the resonant bars after the cavity separation step; and a cover coupling step of coupling the filter lower cover 95 and the filter upper cover 90 to cover, by the filter lower cover 95, the part cut in the cavity separation step to separate the cavities 12 and 14 and cover, by the filter upper cover 90, the open upper sides of the cavities 12 and 14 after the component installation step.

Figure 13A:
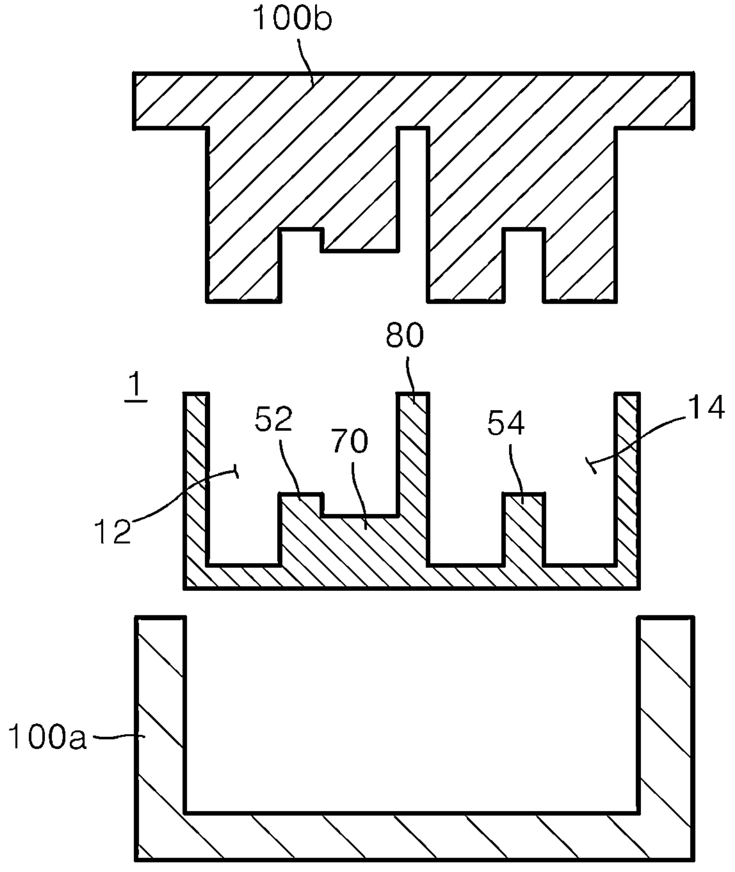
FIGS. 13A to 13D are cross-sectional front views illustrating a method of manufacturing the cavity filter according to the present invention.
Figure 13B:
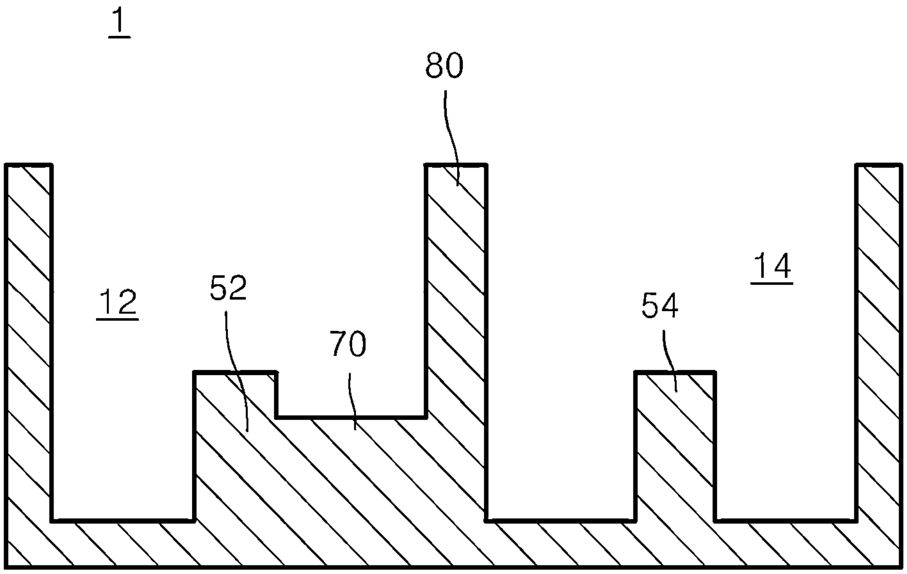

More specifically, as illustrated in FIGS. 13A and 13B, the injection molding step is a step of performing casting to integrally injection mold the resonant bars, the horizontal portion 70, and the vertical post 80 for a notch by using a lower stationary mold 100*a* and an upper movable mold 100*b* that is movable downward from above the lower stationary mold 100*a* and has a shape frame having a space defined between the lower stationary mold 100*a* and the upper movable mold 100*b* so that a predetermined molten material is injected into the space and cured in the space.

Figure 13C:
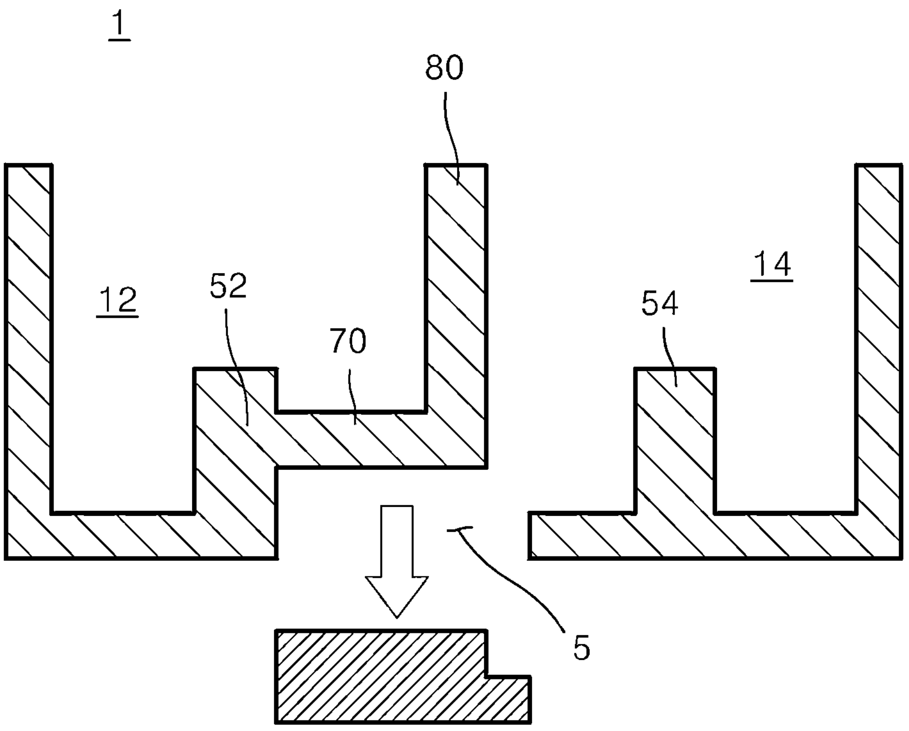
Figure 13D:
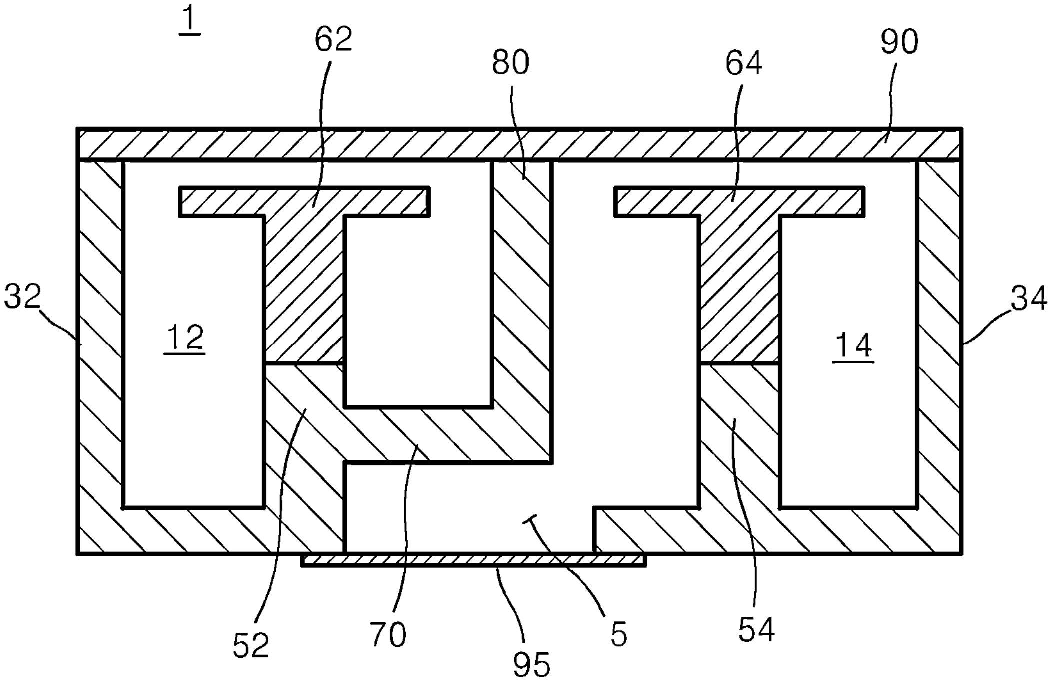

Further, as illustrated in FIG. 13C, the cavity separation step is a step of allowing the lower end of the vertical post 80 for a notch and the lower end of the horizontal portion 70 including the same to be spaced apart from the bottom surface of the cavity (particularly, the second cavity 12) at a predetermined distance (see reference numeral 5 in FIG. 13C) and cutting and separating one side cavity (the second cavity 12) and the other side cavity (the fourth cavity 14) so that one side cavity (the second cavity 12) and the other side cavity (the fourth cavity 14) are not connected to each other.

Next, the component installation step is a step of coupling the separately manufactured tuning plates 61 to 66 to the upper ends of the resonant bars so that the tuning plates 61 to 66 may be combined with the non-illustrated tuning screws to enable frequency tuning.

Lastly, the cover coupling step is a step of covering the cut part (see reference numeral 5 in FIG. 13C) of the bottom surface formed in the cavity separation step by constituting the bottom surfaces of the cavities 12 and 14 by using the filter lower cover 95 so that the cut part is not opened downward, covering the open upper sides of the cavities 12 and 14 by using the filter upper cover 90, and installing the non-illustrated tuning screws.

The embodiments of the cavity filter and the method of manufacturing the same according to the present invention have been described above in detail with reference to the accompanying drawings. However, the present invention is not necessarily limited by the embodiments, and various modifications of the embodiment and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the cavity filter, which is easily manufactured and designed to relatively strongly excite electric coupling by suppressing magnetic coupling and includes the vertical post integrated with the resonant bar without a separate component for maximizing electric coupling, and the method of manufacturing the same.

The invention claimed is:

1. A cavity filter comprising:

a first cavity and a second cavity arranged adjacent to each other and sharing a common wall therebetween;

a first resonant bar disposed in the first cavity and a second resonant bar disposed in the second cavity, each of the first and second resonant bars extending in a longitudinal direction parallel to the common wall; and a coupling post extending from the first resonant bar toward the common wall in a direction perpendicular to the longitudinal direction, wherein the first resonant bar and the coupling post are integrally formed as a single body.

2. The cavity filter of claim 1, further comprising:

a horizontal portion connecting the coupling post to the first resonant bar, wherein the horizontal portion and the coupling post are formed as a single body.

3. The cavity filter of claim 2, wherein the first resonant bar the second resonant bar, the coupling post, and the horizontal portion are formed through an injection molding process.

4. The cavity filter of claim 3, wherein the first resonant bar, the second resonant bar, the coupling post, and the horizontal portion are formed through an injection molding process followed by a partial cutting process.

5. The cavity filter of claim 2, further comprising:
a cover plate configured to enclose upper openings of the first cavity and the second cavity,
wherein an upper end of the coupling post contacts a lower surface of the cover plate with a predetermined assembly tolerance.

6. The cavity filter of claim 5, wherein
the coupling post comprises an upper portion configured to contact the lower surface of the cover and a lower portion configured to be spaced apart from bottom surfaces of the first cavity and the second cavity.

7. The cavity filter of claim 2, wherein the horizontal portion and a lower end of the coupling post are positioned at a predetermined distance from bottom surfaces of the first cavity and the second cavity.

8. The cavity filter of claim 7, wherein the electromagnetic coupling between the first cavity and the second cavity transitions from capacitive coupling to inductive coupling when the horizontal portion and the lower end of the coupling post contact the bottom surfaces of the first cavity and the second cavity, and
wherein the electromagnetic coupling transitions back to capacitive coupling when the horizontal portion and the lower end of the coupling post are separated from the bottom surfaces of the first cavity and the second cavity.

9. The cavity filter of claim 2, wherein a strength of the capacitive coupling increases with an increase in a separation distance between the horizontal portion and the bottom surfaces of the first cavity and the second cavity.

10. The cavity filter of claim 2, wherein the coupling post comprises one of a cylindrical shape and a prismatic shape, and the horizontal portion comprises a rectangular bar having a width corresponding to a cross-sectional width of the coupling post and extending with a predetermined thickness in a vertical direction.

11. The cavity filter of claim 2, wherein the horizontal portion extends in a direction perpendicular to an extending direction of the coupling post.

12. The cavity filter of claim 1, wherein:
the coupling post has a quadrangular horizontal cross-section.

13. The cavity filter of claim 1, wherein:
the first cavity and the second cavity are arranged to define an open section in a diagonal direction with respect to each other.

14. The cavity filter of claim 1, further comprising:
tuning plates respectively installed at upper ends of the resonant bars and spaced apart from a lower surface of a cover at a predetermined distance.

15. The cavity filter of claim 14, wherein:
the tuning plates enable frequency tuning by using tuning screws.

16. A cavity filter comprising:
a first cavity and a second cavity arranged adjacent to each other and sharing a common wall therebetween;
a first resonant bar disposed in the first cavity and a second resonant bar disposed in the second cavity, each of the first and second resonant bars extending in a longitudinal direction parallel to the common wall;
a coupling post extending from the first resonant bar toward the common wall in a direction perpendicular to the longitudinal direction;
a cover plate configured to enclose upper openings of the first cavity and the second cavity,
wherein an upper end of the coupling post is configured to face the cover plate with a gap therebetween, and
wherein electromagnetic coupling between the first cavity and the second cavity transitions from a first state where capacitive coupling is dominant to a second state where inductive coupling is dominant when the gap between the cover plate and the upper end of the coupling post exceeds a predetermined assembly tolerance.

17. The cavity filter of claim 16, wherein the gap is below 0.1 mm.

18. A cavity filter comprising:
a first cavity and a second cavity arranged adjacent to each other;
a first resonant bar disposed in the first cavity and a second resonant bar disposed in the second cavity;
a coupling post extending from the first resonant bar toward the common wall between the first cavity and the second cavity, wherein the coupling post is integrally formed as a single body with the first resonant bar; and
a tuning post integrally formed with the coupling post and extending from the coupling post toward the second resonant bar by a predetermined length for adjusting capacitive coupling between the first cavity and the second cavity.

* * * * *